United States Patent [19]

Simpson

[11] Patent Number: 4,833,394
[45] Date of Patent: May 23, 1989

[54] ION BEAM PROFILE ANALYZER WITH NOISE COMPENSATION

[75] Inventor: Michael L. Simpson, Knoxville, Tenn.

[73] Assignee: Oak Ridge Associated Universities, Inc., Oak Ridge, Tenn.

[21] Appl. No.: 239,458

[22] Filed: Sep. 1, 1988

Related U.S. Application Data

[63] Continuation-in-part of Ser. No. 203,714, Jun. 7, 1988, abandoned.

[51] Int. Cl.$^4$ ............................................. G01N 27/62
[52] U.S. Cl. .................................. 324/71.3; 324/71.1
[58] Field of Search ....................... 324/71.1, 71.3, 72, 324/72.5, 457, 459; 315/111.91, 111.81; 318/629; 307/520; 328/165, 167; 250/305, 306, 315.3, 288; 364/574

[56] References Cited

U.S. PATENT DOCUMENTS

| | | | |
|---|---|---|---|
| 3,207,982 | 9/1965 | Rose | 324/71.1 |
| 3,465,244 | 9/1969 | Wahlin | 324/71.1 |
| 3,638,111 | 1/1972 | Ennis, Jr. et al. | 324/71.1 |
| 3,789,298 | 1/1974 | Herb | 324/71 |
| 3,924,124 | 12/1975 | Favre et al. | 250/281 |
| 4,317,995 | 3/1982 | Bradshaw et al. | 250/288 |
| 4,540,884 | 9/1985 | Stafford et al. | 250/282 |
| 4,650,999 | 3/1987 | Fies, Jr. et al. | 250/282 |

Primary Examiner—Reinhard J. Eisenzepf
Assistant Examiner—Jack B. Harvey
Attorney, Agent, or Firm—Luedeka, Hodges, & Neely

[57] ABSTRACT

An apparatus for producing a signal that is representative of the profile of an ion beam and compensates for the system noise of the ion beam profile scanner includes an ion beam profile scanner which produces a beam profile signal that is proportional to the profile of the ion beam and that has system noise from the scanner. A reference signal is produced which has a frequency proportional to the scan frequency of the beam profile signal, and at least one harmonic of the reference signal is also produced. The reference signal and at least one harmonic of the reference signal are individually adjusted in phase and amplitude to match the system noise in the beam profile signal, and the two adjusted signals are subtracted from the beam profile signal in a summation circuit. The resulting signal is representative of the beam profile and has reduced noise as compared to the beam profile signal.

11 Claims, 3 Drawing Sheets

OUTPUT SIGNAL WITH A GAIN OF 20,
A 15 KHZ POLE AND THE CHANGING
CAPACITANCE COMPENSATION INCLUDED

ION BEAM PROFILE ANALYZER WITH NOISE COMPENSATION

This application is a continuation-in-part of U.S. application Ser. No. 203,714, filed June 7, 1988, now abandoned.

FIELD

The present invention relates to apparatus for scanning the profile and intensity of particle beams and particularly relates to apparatus having systematic noise in the scanner.

BACKGROUND

Particle beams are often used in the study of nuclear physics and they are difficult to analyze because their intensity levels are low compared to environmental noise. Because of their low intensity levels, it is important to minimize or compensate for the noise generated by scanners that are used in determining the profiles of these beams.

Ion beam profile scanners, such as the one disclosed in U.S. Pat. No. 3,789,298, issued Jan. 29, 1974 to Herb, experience system noise from sources such as the motion of the probe through the beam, changing capacitance between the moving probe and the charged detector, and pickup from line power. Many of these noise sources have frequencies at or near the range of typical beam sample rates (scan rates) of 10–30 Hz and the noise frequency will often drift. For this reason, system noise is often difficult to filter out from the desired signal.

System noise may be reduced within the ion beam profile scanner. In prior art devices, such as the Herb patent referenced above, the detector is generally a cylinder coaxial with the ion beam and perpendicular to the axis of rotation of the probe. Using this detector construction, it was discovered that systematic noise may be reduced by using an uncharged cylindrical detector. But, since charged particles are to be detected, using an uncharged detector places a severe limitation on the sensitivity of the detector. The loss in sensitivity, however, is justified by the noise reduction of this design.

In one ion beam detector a charged plate detector is configured and oriented to present a substantially symmetric view to a rotating ion beam probe. One such detector is a circular metal disc. As the probe rotates, there is very little or no changing capacitance between the detector and the probe. Since the probe may not rotate with perfect symmetry in a perfect plane, however, the detector may have to be mechanically adjusted until system noise is reduced to acceptable levels. Even with the reduced noise levels achieved by the use of symmetric view collectors, there remains a substantial amount of noise having a frequency at or near the scan rate of the probe.

SUMMARY

In the present invention, the presence of system noise has been recognized and an apparatus has been devised that significantly reduces the systematic noise present in the final signal that represents the profile of the ion beam. In the present invention, it has been recognized that at least part of the system noise of an ion beam scanner occurs at or near the scan rate of the scanner and the noise frequency will follow drifts or slight changes in the scan rate and, further, that a significant amount of system noise also occurs at harmonics of the scan rate. Usually, a single harmonic contains most of the noise found in the harmonic frequencies. In accordance with the present invention, the apparatus includes an ion beam profile scanner which produces a beam profile signal that is proportional to the profile of the ion beam, and which has a characteristic frequency that is a function of the rate of movement of a probe through the ion beam. The signal also contains system noise from the scanner including noise from the motion of the probe through the ion beam, changing capacitance between the moving probe and the detector, and pickup from line power. At least part of the noise has the characteristic frequency or a harmonic of the characteristic frequency of the beam profile signal.

A reference signal is produced which has a frequency proportional to the characteristic frequency of the beam profile signal. In addition, at least one harmonic of the reference signal is also produced. The reference signal and at least one harmonic of the reference signal are individually adjusted in phase and amplitude to match the system noise in the beam profile signal. The adjusted reference signal and at least one adjusted harmonic of the reference signal are subtracted in a summation circuit from the beam profile signal, and the resulting signal is representative of the beam profile with reduced system noise as compared to the beam profile signal.

One preferred embodiment of the invention provides for an ion beam profile scanner with a curved wire probe that is rotated through the ion beam. The probe is constructed of material that will emit electrons when struck by the ion beam. As the probe is rotated by a drive motor, it encounters the ion beam and emits electrons in proportion to the number of ions striking the probe. The electrons are attracted to a detector which is composed of a charged metal surface, and the detector produces a signal which is proportional to the number of electrons striking the surface of the detector. The signal from the detector is proportional to the profile of the ion beam but it also contains the system noise from the scanning process. This noise has frequencies including the scan frequency and harmonics thereof.

The preferred embodiment of the invention produces a reference signal by means of a magnetic pickup mounted on the probe drive motor. The reference signal has a frequency that is some multiple of the rotation of the probe. Since the probe moves through the beam twice each rotation, the reference signal will have a frequency that is proportional to the beam profile signal frequency. At least one harmonic of the reference signal is also produced. The reference signal and at least one harmonic of the reference signal are individually adjusted in phase and amplitude to represent the system noise in the ion beam profile scanner. A summation circuit is then used to subtract the adjusted reference signal and at least one adjusted harmonic of the reference signal from the beam profile signal.

The preferred embodiment of the invention yields a signal that is representative of the profile of the ion beam but with the system noise of the ion beam profile scanner substantially removed. That signal may then be recorded and/or displayed for analysis.

BRIEF DESCRIPTION OF THE DRAWINGS

The present invention may be best understood by reference to the following detailed description of exemplary embodiments when considered in conjunction with the drawings in which.

DETAILED DESCRIPTION OF THE DRAWINGS

Figure 1:
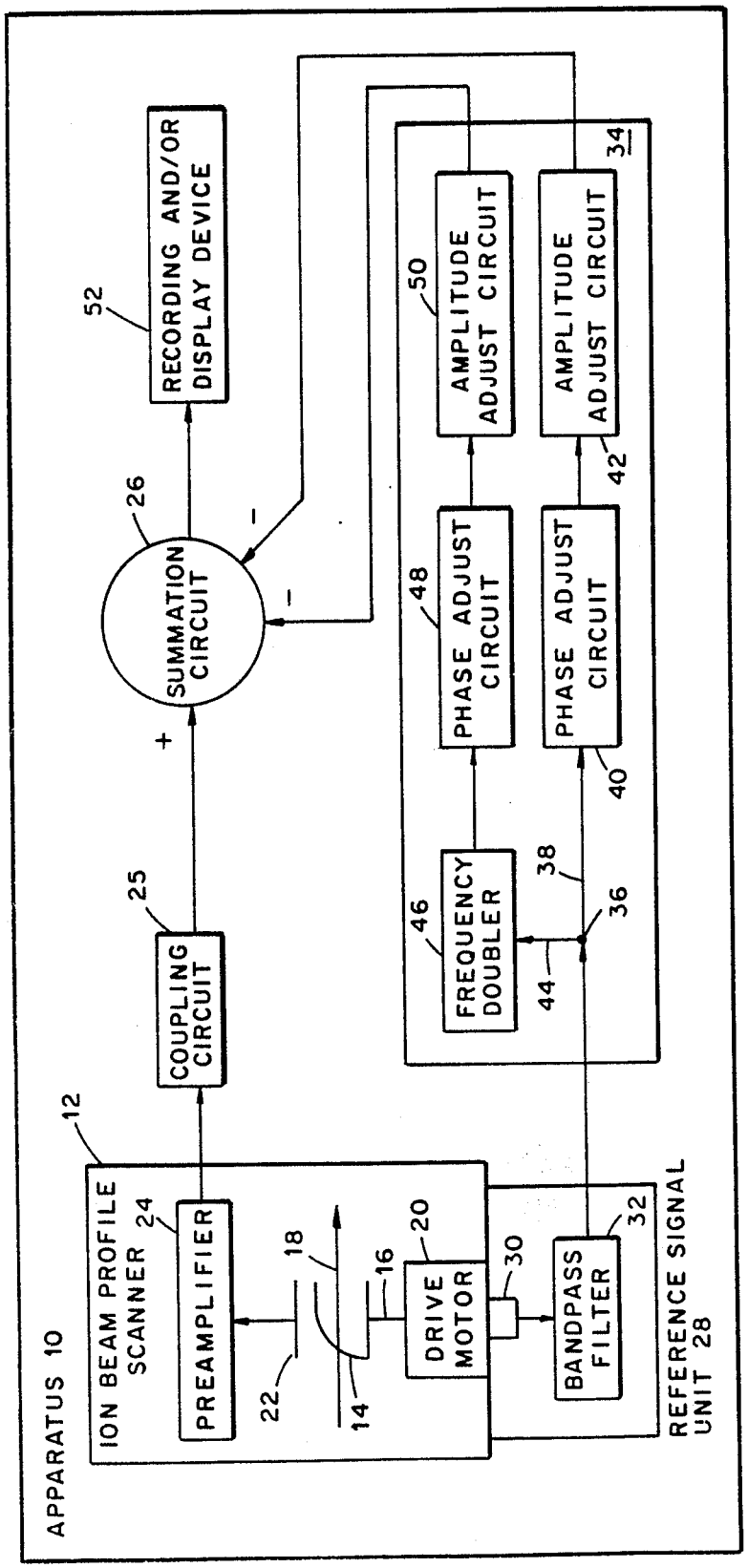
FIG. 1 is a block schematic diagram of the apparatus for producing a signal that is representative of the profile of an ion beam and compensates for the system noise of the ion beam profile scanner.

Referring now to the drawings in which like reference characters designate like or corresponding parts throughout the several views, there is shown in FIG. 1 an apparatus 10 embodying a preferred form of the present invention. Apparatus 10 includes an ion beam profile scanner 12. In the preferred mode of ion beam profile scanner 12, a curved wire probe 14 is mounted on a shaft 16 and in the path of ion beam 18. Shaft 16 is perpendicular to ion beam 18 and is attached at the end opposite probe 14 to drive motor 20. Drive motor 20 causes shaft 16 and probe 14 to rotate, with probe 14 passing twice through ion beam 18 each rotation. Probe 14 is composed of a material that emits electrons when struck by the ions of ion beam 18. A beam scanner having a curved wire probe 14 is commerically available from National Electrostatic Corporation, model BPM-6, but such scanner has a different electron detector system from that shown in FIG. 1.

In the scanner 12, the electrons emitted from probe 14 are attracted to and detected by charged detector 22. Detector 22 generates a signal that is proportional to the number of electrons that are detected and this signal is amplified by preamplifier 24. The output signal from preamplifier 24 is representative of the profile of ion beam 18; in addition, system noise from sources such as the motion of probe 14 through ion beam 18, the changing capacitance between moving probe 14 and the charged detector 22, and pickup from line power are also in the signal. The output signal from preamplifier 24 is the beam profile signal and is applied through coupling circuit 25 to summation circuit 26 which will be described in more detail hereinafter.

A reference signal is produced in the reference signal unit 28. Reference signal unit 28 includes a magnetic pickup 30 which is attached to drive motor 20. Magnetic pickup 30 produces a reference signal which is a multiple of the frequency of rotation of drive motor 20, shaft 16, and probe 14. The signal from magnetic pickup 30 also contains undesired harmonics of the reference signal. The signal from magnetic pickup 30 is applied to bandpass filter 32 where all signals but the desired reference signal are filtered out. The reference signal is then applied to a processing circuit 34 for producing an adjusted reference signal and at least one adjusted harmonic of the reference signal.

Circuit 34 includes a junction 36 where the reference signal is apportioned onto two paths. One path 38 generates an adjusted reference signal. The reference signal on path 38 is applied to the phase adjust circuit 40 to adjust the phase of the reference signal to the phase of system noise with the same frequency as the reference signal. The phase adjusted reference signal is then applied to amplitude adjust circuit 42 to adjust the amplitude of the reference signal to the amplitude of system noise with the same frequency as the reference signal. The resulting adjusted reference signal is then applied to summation circuit 26 which will be described in more detail hereinafter.

The second path 44 onto which junction 36 apportions the reference signal generates at least one adjusted harmonic of the reference signal. The reference signal on path 44 is applied to frequency doubler 46 which produces the first harmonic of the reference signal. In this embodiment, the first harmonic is chosen because most of the noise in the harmonic frequencies is in the first harmonic. However, it may be advantageous in other applications to use one or more other harmonics in addition to, or in substitution for, the first harmonic. The first harmonic of the reference signal is then applied to phase adjust circuit 48 to adjust the phase of the first harmonic of the reference signal to the phase of system noise with the same frequency as the first harmonic of the reference signal. The phase adjusted first harmonic of the reference signal is then applied to amplitude adjust circuit 50 to adjust the amplitude of the first harmonic of the reference signal to the amplitude of system noise with the same frequency as the first harmonic of the reference signal. The resulting adjusted first harmonic of the reference signal is then applied to summation circuit 26.

In the preferred mode of the invention, substantially all of the system noise may be compensated for by generating an adjusted reference signal with the same frequency as drive motor 20 and an adjusted first harmonic of the reference signal. These adjusted signals are then applied to summation circuit 26.

Summation circuit 26 subtracts the adjusted reference signal and at least one adjusted harmonic of the reference signal of means 34 from the beam profile signal of ion beam profile scanner 12. The resulting signal is representative of the profile of ion beam 18 substantially without the system noise generated in ion beam profile scanner 12. This signal is then applied to recording and/or display device 52 to record and/or display the signal.

Figure 2:
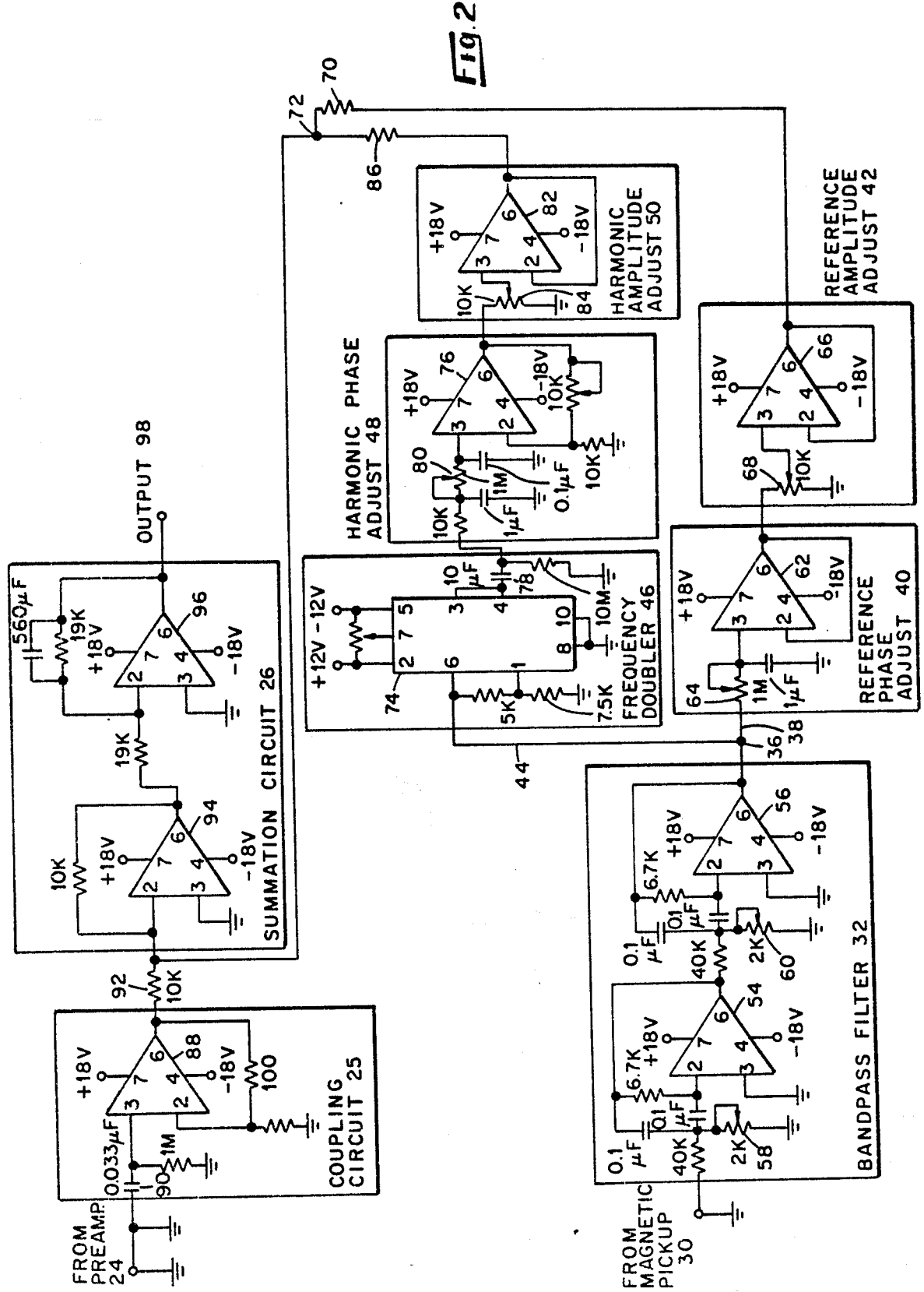
FIG. 2 is a schematic diagram of the reference signal means block, means for producing an adjusted reference signal and at least one adjusted harmonic of the reference signal block, and the summation circuit block of FIG. 1.

In FIG. 2, a more detailed description is shown of bandpass filter 32, processing circuit 34, and summation circuit 26. Referring to FIGS. 1 and 2 the signal from magnetic pickup 30 is applied to bandpass filter 32. In the preferred mode, the drive motor 20 rotates at approximately 19 Hz. Magnetic pickup 30 generates a signal at approximately 19 Hz but with a number of undesired harmonics included. The two stages of bnadpass filter 32 substantially remove the undesired harmonics and allow passage of the 19 Hz reference signal. The two stage bandpass filter 32 includes first stage operational amplifier 54 and second stage operational amplifier 56. The center frequency of bandpass filter 32 may be adjusted by potentiometer 58 of the first stage and potentiometer 60 of the second stage. The output signal of second stage operational amplifier 56 is the reference signal and is applied to the processing circuit 34 for producing an adjusted reference signal and at least one adjusted harmonic of the reference signal.

Processing circuit 34 includes junction 36 where the reference signal is apportioned onto two paths. One path 38 generates an adjusted reference signal. The reference signal of path 38 is applied to operational amplifier 62 of phase adjust circuit 40 through phase adjust potentiometer 64. The phase adjusted reference signal from operational amplifier 62 is then applied to the operational amplifier 66 of amplitude adjust circuit 42 through amplitude adjust potentiometer 68. The output signal of operational amplifier 66 is the adjusted reference signal which is applied through resistor 70 and junction 72 to summation circuit 26.

The second path 44 onto which junction 36 apportions the reference signal generates at least one adjusted harmonic of the reference signal. The reference signal on path 44 is applied to integrated circuit 74 of frequency doubler 46 which produces the first harmonic of the reference signal. The first harmonic of the reference signal is applied to operational amplifier 76 of phase adjust circuit 48 through coupling capacitor 78 and phase adjust potentiometer 80. The phase adjusted first harmonic of the reference signal from operational amplifier 76 is then applied to the operational amplifier 82 of amplitude adjust circuit 50 through amplitude adjust potentiometer 84. The output signal of operational amplifier 82 is the adjusted first harmonic of the reference signal which is applied through resistor 86 and junction 72 to summation circuit 26. In the preferred mode of the invention, operational amplifiers 54, 56, 62, 66, 76, 82, 88, 94, and 96 are LF356N DIP integrated circuits. Integrated circuit 74 of frequency doubler 46 is an AD533C metal can.

In operation, the beam profile signal from the preamplifier 24 of ion beam profile scanner 12 is applied to operational amplifier 88 through coupling capacitor 90 of coupling circuit 25. The beam profile signal is amplified by operational amplifier 88 and then applied to summation circuit 26 through resistor 92.

The summation circuit 26 receives the beam profile signal from coupling circuit 25 and the adjusted reference signal and the adjusted first harmonic of the reference signal from means 34, all on pin 2 of operational amplifier 94. It will be appreciated from reference to the circuit shown in FIG. 2 that the adjusted reference signal and the adjusted first harmonic signal are inverted with respect to the beam profile signal as it appears at the output of operational amplifier 88, and, thus, the two adjusted signals are subtracted from the profile signal at pin 2 of operational amplifier 94. The signals are thus applied to the first stage operational amplifier 94 of summation circuit 26 and then to the second stage operational amplifier 96. The signal at output 98 is representative of the profile of ion beam 18. The system noise introduced into the signal in ion beam profile scanner 12 has been removed by subtraction of the compensating adjusted reference signal and adjusted first harmonic of the reference signal.

Figure 3:
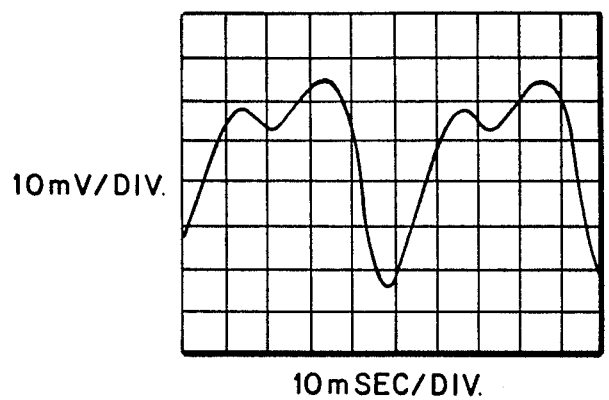
FIG. 3 is a graph of the output signal of the detector of an ion beam profile scanner without the systematic noise compensation circuits.
Figure 4:
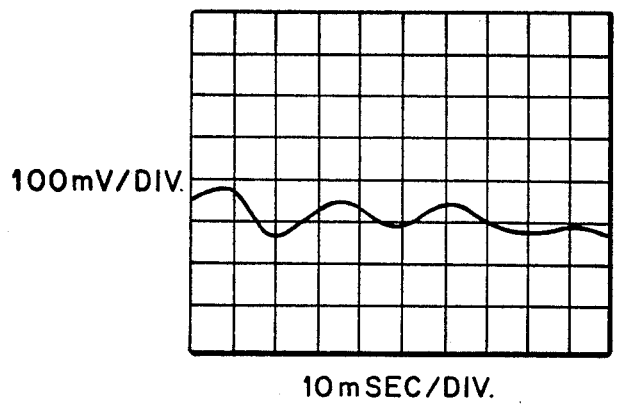
FIG. 4 is a graph of the output signal of the detector of an ion beam profile scanner with the systematic noise compensation circuits.

In the absence of an ion beam, the signal from the ion beam profile scanner 12 shows systematic noise as in FIG. 3. When compensation is provided by processing circuit 34 and summation circuit 26, the resulting signal has a much lower noise level as is shown in FIG. 4.

The circuits of meand 34 may be adjusted to minimize the system noise in the beam profile signal from ion beam profile scanner 12. The adjustment is performed without ion beam 18 present and with probe 14 rotating, and the signal from detector 22 and preamplifier 24 is applied to coupling circuit 25. The output of first harmonic amplitude adjust operational amplifier 82 is disconnected from the input of summation circuit first stage operational amplifier 94. The outputs of coupling circuit operational amplifier 88 and reference signal amplitude adjust operational amplifier 66 are monitored on a two-channel oscilloscope. The output signal of reference signal amplitude adjust operational amplifier 66 is inverted at the oscilloscope. The reference signal phase adjust potentiometer 64 is then adjusted until the phases of the two signals are equal. The reference signal amplitude adjust potentiometer 68 is then adjusted until the amplitudes of the two signals are equal. The outputs of the first harmonic amplitude adjust operational amplifier 82 and summation circuit first stage operational amplifier 94 are then monitored on a two-channel oscilloscope using a chopped trace. The first harmonic signal phase adjust potentiometer 80 is then adjusted until the phases of the two signals are equal. The first harmonic signal amplitude adjust potentiometer 84 is then adjusted until the amplitudes of the two signals are equal. The output of the first harmonic amplitude adjust operational amplifier 82 is then reconnected to the input of summation circuit first stage operational amplifier 88. Apparatus 10 is then ready for operation.

From the above description it will be appreciated that the present invention provides an improved ion beam scanner having significantly reduced noise levels as compared to prior art devices of similar type. Although a preferred embodiment is described, it will be appreciated that the invention is capable of numerous modifications, rearrangements and substitution of parts without departing from the spirit and scope of the invention as set forth in the appended claims.

What is claimed is:

1. An apparatus for producing a signal that is representative of the profile of an ion beam and compensates for noise, comprising:
   ion beam profile scanner means for scanning the ion beam at a predetermined scan frequency and for producing a beam profile signal that is proportional to the profile of the ion beam and includes noise;
   reference signal means for producing a reference signal that has a frequency proportional to the scan frequency of said ion beam profile scanner means;
   harmonic means for producing at least one harmonic signal that is a harmonic of the reference signal; and
   combining circuit means for combining the beam profile signal, the reference signal and the harmonic signal to produce a combined signal that is proportional to the ion beam profile and has reduced noise as compared to the beam profile signal.

2. The apparatus of claim 1 wherein said combining circuit means further comprises summation circuit means for adding the beam profile signal, subtracting said reference signal and subtracting the harmonic signal to produce a summation signal that is proportional to the profile of the ion beam with reduced noise as compared to the beam profile signal.

3. An apparatus for producing a signal that is representative of the profile of an ion beam and compensates for noise, comprising:
   ion beam profile scanner means for scanning the ion beam at a scan frequency and for producing a beam profile signal that is proportional to the profile of the ion beam and contains noise having at least one characteristic noise parameter;
   reference signal means for producing a reference signal that has a frequency proportional to the characteristic noise parameter;
   means for producing at least one harmonic signal that is a harmonic of the reference signal;

means for adjusting the reference signal and the at least one harmonic signal by an adjustment function that is proportional to the characteristic noise parameter to produce an adjusted reference signal and at least one adjusted harmonic signal that correspond at least in part to the noise; and combining circuit means for combining the beam profile signal, the adjusted reference signal, and the at least one harmonic signal to produce a combined signal that is proportional to the profile of the ion beam with reduced noise as compared to the beam profile signal.

4. The apparatus of claim 3 wherein said means for adjusting comprises means for individually adjusting the phase of the reference signal and the at least one harmonic signal in relation to the characteristic noise parameter whereby the adjusted reference signal and the adjusted harmonic signal will cancel at least part of the noise when combined by the combining circuit.

5. The apparatus of claim 3 wherein said characteristic noise parameter is the scan frequency of said scanner means and said means for producing and said means for adjusting further comprise means for individually adjusting the phase of the reference signal and the at least one harmonic signal to correspond in phase with the beam profile signal, whereby the adjusted reference signal and the adjusted harmonic signal will cancel at least part of the noise when combined by the combining circuit.

6. The apparatus of claim 3 wherein said combining means further comprise summation circuit means for adding the beam profile signal, subtracting the adjusted reference signal and subtracting the adjusted harmonic signal to produce a summation signal that is proportional to the profile of the ion beam with reduced noise as compared to the beam profile signal.

7. An apparatus for producing a signal that is representative of the profile of ion beam and compensates for noise, comprising:
a probe constructed of a material that emits electrons when struck by an ion beam;
drive means for moving said probe through the ion beam to cause emission of electrons from said probe;
collector means for collecting said emitted electrons and producing a collector signal corresponding to the number of emitted electrons;
monitor means for monitoring said drive means and producing a reference signal corresponding to the rate at which said drive means moves the probe through the ion beam;
harmonic means for producing a harmonic signal that is a harmonic of the reference signal;
combining circuit means for combining the beam profile signal, the reference signal and the harmonic signal to produce a combined signal that has reduced noise as compared to the collector signal.

8. The apparatus of claim 7 wherein said monitoring means and said harmonic means further comprise adjustment means for adjusting the phase of the reference signal and the harmonic signal in relation to the phase of the collector signal.

9. The apparatus of claim 7 wherein said monitor means and said harmonic means further comprise adjustment means for adjusting the phase and amplitude of the reference signal and the harmonic signal in relation to the phase and amplitude of the collector signal to produce at least two adjusted signals.

10. The apparatus of claim 7 wherein said monitor means and said harmonic means further comprise adjustment means for adjusting the amplitude of the reference signal and the harmonic signal in relation to the amplitude of the collector signal that are combined by the combining circuit means.

11. The apparatus of claim 7 wherein said monitor means, harmonic means and combining means further comprise:
adjustment means for adjusting the phase of the reference signal and the harmonic signal in relation to the phase of the collector signal to produce at least two adjusted signals; and
summation circuit means for adding the collector signal and subtracting the at least two adjusted signals to produce the combined signal.

* * * * *